United States Patent [19]

Fayling

[11] 3,787,839

[45] *Jan. 22, 1974

[54] MAGNETIC VIEWER DEVICE HAVING MOVABLE ANISOTROPIC ELEMENTS

[75] Inventor: Richard E. Fayling, White Bear Lake, Minn.

[73] Assignee: Minnesota Mining and Manufacturing Company, St. Paul, Minn.

[ * ] Notice: The portion of the term of this patent subsequent to June 6, 1989, has been disclaimed.

[22] Filed: Nov. 12, 1970

[21] Appl. No.: 88,708

[52] U.S. Cl. .......................... 340/381 R, 340/373 R

[51] Int. Cl. .............................................. G08b 5/22

[58] Field of Search...... 340/381 R, 373 R; 35/61 R

[56] References Cited

UNITED STATES PATENTS

| | | | |
|---|---|---|---|
| 3,426,453 | 2/1969 | Dingwall et al. | 35/61 |
| 3,444,551 | 5/1969 | Winrow | 340/373 X |
| 3,469,258 | 9/1969 | Winrow | 340/373 |
| 3,140,553 | 7/1964 | Taylor | 340/373 X |
| 3,266,033 | 8/1966 | Frohbach | 340/373 X |
| 3,518,664 | 6/1970 | Taylor | 340/373 |
| 3,540,038 | 11/1970 | Taylor | 340/373 |
| 3,543,202 | 11/1970 | Naybor | 340/373 X |
| 3,553,619 | 1/1971 | Skrobisch | 340/373 X |

*Primary Examiner*—Harold I. Pitts
*Attorney, Agent, or Firm*—Alexander, Sell, Steldt & Delahunt

[57] ABSTRACT

A magnetic data viewer device for providing a visual indication of data encoded in a magnetically encoded document, which data is represented by the magnetic polarity alignments at each of a plurality of disparate magnetized regions defining a fixed two-dimensional pattern. This device is a non-magnetizable board containing a plurality of sockets positioned in a fixed pattern. The sockets each contain a disk containing magnetically hard material which is magnetized to have a given magnetic polarity alignment. At least one broad surface of the disk has a visual indicator for providing an indication of the magnetic polarity alignment of the disk. Each of the disks is visible in its socket, is restrained from movement within its socket by only the dimensions of the socket, and is movable within its socket to assume an orientation corresponding to the magnetic polarity alignment at a said magnetized region. In one preferred embodiment, the magnetically hard material of each disk is magnetized to provide a polarity alignment wherein the opposite broad surfaces of each disk have opposite magnetic polarities; the broad surface of one polarity has a visual indicator of a first color and the broad surface of the opposite polarity has a visual indicator of a second color; and each disk is movable to assume any orientation within its socket. In another preferred embodiment, the manetically hard material is magnetized to provide a polarity alignment wherein one broad surface has a pair of magnetized sections of opposite polarities having a boundary therebetween, and the opposite broad surface has a visual indicator corresponding to the boundary for indicating the orientation of the boundary. In both embodiments, each disk preferably includes uniaxially anisotropic magnetically hard material oriented to have an easy axis of magnetization perpendicular to the broad surfaces of the disk. The magnetically hard material is magnetized in the direction of this easy axis. The residual induction $B_r$ of each disk and the spacing of the sockets are so selected that, in the absence of an applied external magnetic field, the disks are attracted by each other to align themselves in a stable position wherein the broad surfaces of the disks are skewed in the sockets.

15 Claims, 15 Drawing Figures

PATENTED JAN 22 1974 3,787,839

INVENTOR.
RICHARD E. FAYLING
BY Kinney, Alexander, Sell, Steldt & DeLaHunt
ATTORNEYS

MAGNETIC VIEWER DEVICE HAVING MOVABLE ANISOTROPIC ELEMENTS

CROSS REFERENCE TO RELATED APPLICATION

This application is related to my copending application entitled "Magnetically Encoded Document" Ser. No. 88,621 filed Nov. 12, 1971, now U.S. Pat. No. 3,714,664.

BACKGROUND OF THE INVENTION

1. Field Of The Invention

The present invention pertains to magnetically controlled visual communications and is specifically directed to a device and a method for providing a visual indication of data represented by the magnetic polarity alignments at a plurality of disparate magnetized regions defining a fixed two-dimensional pattern.

The present invention is useful as a magnetic viewer for providing an indication of data encoded in magnetically encoded documents, such as credit cards.

2. Description Of The Prior Art

Systems for providing an indication of data encoded in magnetically encoded documents, such as credit cards, are described in U. S. Pat. Nos. 3,015,087 to O'Gorman; 3,453,598 to Schweizer; 3,430,200 to Barney; and 3,465,307 to Schmidt. The systems therein described comprise complex electrical circuitry and require the use of electrical power supplies.

SUMMARY OF THE INVENTION

The present invention is a device for providing a visual indication of data encoded in a magnetically encoded document, which data is represented by the magnetic polarity alignments at a plurality of disparate magnetized regions defining a fixed two-dimensional pattern. This novel device comprises a non-magnetizable board containing a plurality of sockets positioned in a fixed pattern. The sockets each contain a disk containing magnetically hard material which is magnetized to have a given magnetic polarity alignment. At least one broad surface of each disk contains a visual indicator for providing an indication of the magnetic polarity alignment of the disk. Each disk is visible in its socket, is restrained from movement within its socket by only the dimensions of the socket, and is movable within its socket to assume an orientation corresponding to the magnetic polarity at a said magnetized region. Preferably the disks lie flat in the sockets upon assuming this corresponding orientation. Also, the board preferably includes a transparent cover over the sockets.

In one preferred embodiment, the magnetically hard material of each of the disks is magnetized to provide a polarity alignment wherein the opposite board surfaces of each disk have opposite magnetic polarities; the broad surface of one polarity has a visual indicator of a first color, and the broad surface of the opposite polarity has a visual indicator of a second color. Each disk is movable to assume any orientation within its socket.

In an alternative preferred embodiment, wherein the device of the present invention is useful as a magnetic viewer for providing an indication of data encoded in magnetically encoded documents, the magnetically hard material of each disk is magnetized to provide a polarity alignment wherein at least one broad surface has a pair of magnetized sections of opposite polarities having a boundary therebetween and at least one opposite broad surface has a visual indicator corresponding to the boundary for indicating the orientation of the boundary.

The magnetic viewer according to either preferred embodiment is useful in providing a visual indication of data encoded in a document comprising a broad stratum containing magnetic material magnetized to provide a plurality of disparate magnetized regions of various polarity alignments defining a fixed two-dimensional pattern over the stratum, wherein the polarity alignments at the disparate magnetized regions represent encoded data. This magnetic viewer has a fixed socket pattern corresponding to the fixed pattern of magnetized regions in the document. When the viewer and document are interfaced so that the fixed socket pattern and the magnetic region pattern of the viewer and document, respectively, are registered with each other, each disk assumes an orientation corresponding to the polarity alignment of the co-registered disparate magnetized region to provide a visual indication for each item of encoded data.

As an optional feature of the magnetic viewer embodiment, the board may be made of transparent material, thereby enabling reading of printed visible indicia on a document while viewing the magnetically encoded data therefrom.

The magnetic viewer of the present invention also has the advantages of being of very simple construction, of being readily portable, of being operable without the use of an external electrical power source, and of providing separate visual indications for each item of recorded data.

In one preferred embodiment, the sockets are enclosed and the background within each socket may be a third color contrasting with the two colors of the disk, thereby making it easier to detect instances when the disks in the viewer are skewed in the sockets rather than lying flat therein. In the skewed position, the disks may also provide an indication of an encoded datum in the document discrete from the data indicated when the disks are lying flat in the sockets.

Preferably the disks each include uniaxially anisotropic magnetically hard material oriented to have an easy axis of magnetization perpendicular to the broad surfaces of the disk. The magnetically hard material is magnetized in the direction of this easy axis.

As a still further feature, the residual induction $B_r$ of the disks and the spacing of the sockets are so selected that, in the absence of an applied external magnetic field, the disks are attracted by one another to align themselves in a stable position, wherein the disks are skewed in the sockets, thereby enabling easy quick positioning of the disks upon the application of external magnetic fields. This feature also provides assurance of the reliability of the device in that by temporarily subjecting the board to externally applied magnetic fields, either related to its viewing or display functions or applied for test purposes, it may be seen whether the disks are free to move.

As still another feature, the back side of the device may contain a stratum containing ferromagnetic material for holding the disks, in the absence of an applied external magnetic field, in the positions to which they are oriented for viewing by the application of external magnetic fields in said fixed pattern, in which oriented position the disks lie flat in the sockets for viewing.

The disks preferably have substantially flat surfaces which need not be circular. The feature of using magnetized disks rather than magnetized spheres as an element for providing a visual indication in response to the application of a magnetic field improves the optical contrast between the different colored surfaces. Also, magnetized disks may be more readily manufactured than spheres, such as by a process wherein disks are stamped from a sheet of magnetized magnetic material. By the same token, the disks may be more readily colored on one side, such as by a process wherein one side of the sheet is painted or by a process wherein a sheet of colored material is adhered to a sheet of magnetized magnetic material prior to the stamping step.

An optional feature of the present invention is the covering of one or both flat surfaces of the magnetized disk with a highly reflective material in order to make the disks more visible. The use of highly reflective material enhances reading by a scanning device positioned to view the board at an angle not necessarily perpendicular thereto. The highly reflective material may be reflex-reflective or mirror-like in order to further enhance visibility.

DESCRIPTION OF THE PREFERRED EMBODIMENTS

Figures 1, 2, 3A, 3B, 4, 5, 6, 7, 8A, 8B, 8C, 9A, 9B, 10, 11:
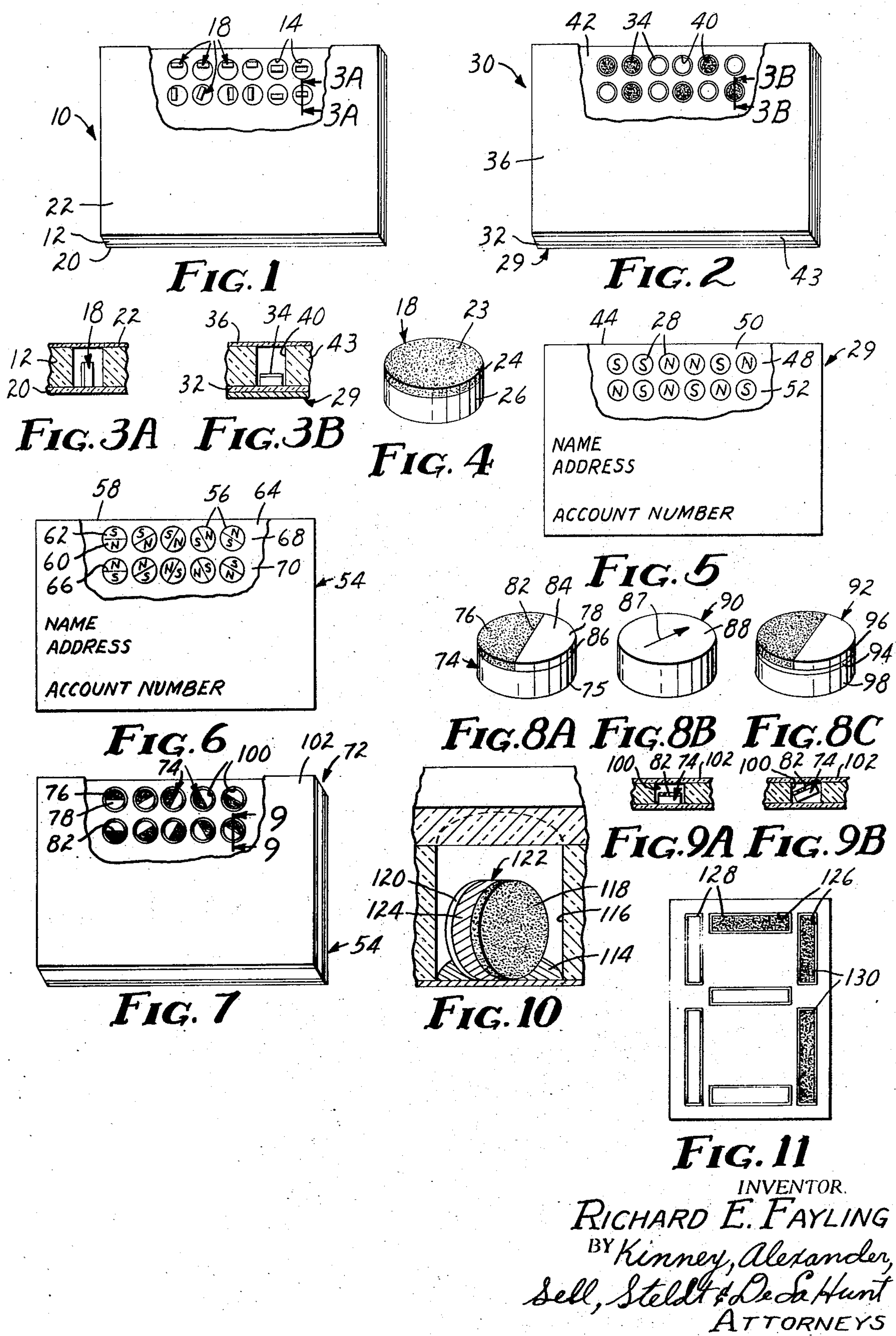
FIG. 1 is a perspective view of one preferred embodiment of the device of the present invention as a magnetic viewer. In this view, a portion of the transparent cover is cut away.
FIG. 2 is a perspective view of an alternative preferred embodiment of a magnetic viewer of the type shown in FIG. 1. In this view, the magnetic viewer is shown in registration with a magnetically encoded document (such as is shown in FIG. 5).
FIG. 3A is a cross-section taken along lines 3A—3A of FIG. 1 of a portion of the magnetic viewer of FIG. 1 containing a single socket containing a magnetized disk of the type shown in FIG. 4 and showing the skewed orientation of the magnetized disk in the socket when the viewer of FIG. 1 is not registered with a magnetically encoded document.
FIG. 3B is a cross-section taken along lines 3B—3B of FIG. 2 of a portion of the magnetic viewer of FIG. 2 containing a single socket containing a magnetized disk of the type shown in FIG. 4 and showing the flat orientation of the magnetized disk in the socket when the viewer of FIG. 2 is registered with a magnetically encoded document.
FIG. 4 is a perspective view of a disk of magnetized magnetically hard material having reflective material on one flat surface thereof, which disk is used as a magnetic field indicator element in the viewers of FIGS. 1 and 2.
FIG. 5 is an elevational view of a magnetically encoded document, such as a credit card, with a surface layer thereof cut away to expose a broad stratum containing magnetically hard material which is magnetized to provide encoded data as a plurality of disparate magnetized regions of various polarity alignments defining a fixed two-dimensional pattern, which polarity alignments upon the surface of the document shown are represented schematically in FIG. 5, although they preferably are not visible to the naked eye.
FIG. 6 is an elevational view of a magnetically encoded document such as is shown in FIG. 5, except that upon the surface of the document shown in FIG. 6 each magnetized region includes oppositely magnetized sections having a boundary therebetween.
FIG. 7 is a perspective view of a magnetic viewer for providing a visual indication of data encoded in the type of magnetically encoded document shown in FIG. 6. In this view, a portion of the transparent cover is cut away and the viewer is shown in registration with the document of FIG. 6.
FIG. 8A is a perspective view of a disk which is used as a magnetic field indicator element in the viewer of FIG. 7. This disk has oppositely magnetized sections and a boundary therebetween on one broad surface thereof, and a visual indicator corresponding to this boundary, which visual indicator consists of a color change in a coating of reflex-reflective material on the opposite broad surface of the disk.
FIG. 8B is a prespective view of a disk of the type shown in FIG. 8A which may also be used as a magnetic field indicator element in the viewer of FIG. 7. This disk has a visual indicator consisting of an arrow placed on the disk at a predetermined angle with respect to the boundary.
FIG. 8C is a perspective view of a disk of the type shown in FIG. 8A, except that it contains a layer of magnetizable metallic foil beneath the coating of reflex-reflective material.
FIG. 9A is a cross-section taken along lines 9—9 of FIG. 7 of a portion of the magnetic viewer of FIG. 7 containing a single socket containing a magnetized disk of the type shown in FIG. 8A and showing the flat orientation of the magnetized disk in the socket when positioned over a boundary between sections of opposite magnetic surface polarities.
FIG. 9B is a cross-section also taken along lines 9—9 of FIG. 7 as in FIG. 9A and showing the skewed orientation of the magnetized disk in the socket when positioned over a magnetized region of a single magnetic surface polarity.
FIG. 10 is a perspective view of an embodiment of that portion of the viewer forming a socket in combination with a magnetized disk, which embodiment is alternative to the embodiments thereof shown in FIGS. 1, 2, and 7.
FIG. 11 is an elevational view of an alternative embodiment of a viewer, such as is shown in FIGS. 1, 2, and 7, wherein the sockets and disks are elongated and the sockets are arranged in a pattern wherein different characters may be formed.

A magnetic viewer for providing an indication of data encoded in a magnetically encoded document is shown in FIG. 1. The viewer 10 comprises a transparent board 12 containing a plurality of sockets 14 positioned in a fixed two-dimensional pattern, and a plurality of magnetized disks 18 of magnetically hard material contained in the sockets 14. The magnetized disks 18 are contained in each of the sockets 14 by a transparent back layer 20 and by a transparent cover 22. Because the viewer of FIG. 1 is transparent, it is possible to read such visible indicia printed on a document, such as a credit card, as the name and account number while viewing the magnetically encoded data.

The disks 18 are made of uniaxially anisotropic magnetically hard barium ferrite particles in a binder or matrix of rubber, plastic, or other nonmagnetic material, such as the permanent magnet material described in the brochure "Plastiform Brand Permanent Magnets," which brochure is available from the Dielectric Materials & Systems Division of Minnesota Mining and Manufacturing Company, St. Paul, Minnesota. This permanent magnet material is oriented in the disks 18 to have an easy axis of magnetization perpendicular to the flat surfaces 23 of the disks 18 (FIG. 4); in the direction of which easy axis the magnetically hard material is magnetized. The disks 18 are magnetized to have a residual induction $B_r$ of approximately 2000 gauss. $B_r$ is defined as "The magnetic induction corresponding to zero magnetizing force in a magnetic material which is in a symmetrically, cyclically magnetized condiion."

The opposite sides of the disks 18 are of contrasting colors provided by a layer of reflective material 24 adhered to a layer of the magnetically hard material 26.

The reflective material 24 of the disks 18 is preferably reflex-reflective material. While any of a great number of reflex-reflective materials described in the literature may be used, as reflex-reflective material having a flat top construction with a protective face over the reflex-reflective elements such as is described in U. S. Pat. No. 2,407,680 is preferred.

To prepare the disks, a sheet of permanent magnet material is uniformly magnetized perpendicular to the plane of the sheet to provide oppositely magnetized surfaces on opposite sides of the sheet of permanent magnet material. A sheet of a reflex-reflective material is applied to the sheet of flexible magnetic material, and the disks are stamped therefrom.

The board 12 consists of a transparent material, such as lucite. The fixed pattern of sockets 14 corresponds to a fixed two-dimensional pattern of disparate magnetized regions 28 of various polarity alignments in a magnetically encoded document 29 (FIG. 5) for use with which the particular viewer 10 is designed. While the number of sockets 14 need not necessarily correspond to the number of magnetized regions 28, a fixed pattern of sockets 14 corresponds to a fixed pattern of magnetized regions 28.

The back layer 20 is constructed of transparent material such as a thin, tough, transparent polyester film. The thickness of the back layer is approximately 3 mils (75 $\mu$).

The edge dimensions of the board 12 are selected to be the same as that of the magnetically encoded document (FIG. 5) for use with which the viewer 10 is designed. In the illustrated embodiment, the board 12 has edge dimensions of 2⅛ inches (5.4 cm) by 3⅜ inches (8.6 cm). The thickness of the board 12 and the depth of each of the sockets 14 is approximately three-sixteenths inch (4.8 mm). The diameter of each of the disks 18 is one-eighth inch (3.2 mm). The thickness of the layer of reflex-reflective material 24 of the disks 18 is approximately 7 mils (0.18 mm). The thickness of the layer of the magnetically hard material 26 of the disks 18 is approximately 30 mils (0.75 mm). The diameter of each of the sockets 14 is approximately 10 mils (0.25 mm) larger than the disk 18 diameter, and the distance between the centers of adjacent sockets is approximately one-fourth inch (6.4 mm). The figures of the Drawing are not drawn to scale.

In a viewer 10 of the foregoing dimensions, in the absence of an external magnetic field, the disks 18 are attracted by one another to align themselves with their flat surfaces 23 skewed in the sockets 14 (see FIG. 1).

The viewer 30 shown in FIG. 2 is constructed in generally the same manner as the viewer 10 of FIG. 1, with the following differences. The back layer or stratum 32 is approximately 7 mils (0.18 mm) thick and is a ferromagnetic material, such as soft iron. The attraction of the disks 34 for the ferromagnetic material is greater than the attraction of the disks 34 for each other, therefore, when in the absence of an applied external magentic field, the disks 34 remain in the flat positions to which they have been discretely rotated by the application of an external magnetic field. This difference is illustrated in FIGS. 3A and 3B. In the former, a disk 18 in the viewer 10 assumes a skewed position in the socket 14 when not in the presence of an applied external magnetic field; whereas a disk 34 in the viewer 30 remains in a flat position in the socket 40 upon assuming this flat position upon registration of the viewer 30 with a magnetically encoded document 29 (FIG. 5).

In an alternative embodiment, the back layer or stratum may contain a matrix of iron cylinders in the fixed pattern adjacent the sockets, wherein the axes of the cylinders are aligned with the sockets and are of a diameter approximately the same as that of the disks.

The surface 42 of the board 43 is colored the same color as one side of the disks 34. In the embodiment of FIG. 2, it is seen that the board 32 and one side of the disks 34 are each colored white and that the opposite sides of the disks 34 are of a contrasting color. Any two contrasting colors may be used, including black and white.

The magnetic viewer of the present invention may be used to provide a visual indication of data encoded in a magnetically encoded document of the type which is described in the aforementioned U.S. Pat. No. 3,453,598 at column 1, lines 33–39; in the aforementioned U.S. Pat. No. 3,430,200 at column 4, line 33, through column 5, line 63; and in U. S. Pat. No. 3,471,862 at column 5, lines 29–47, and at column 11, lines 57–66.

In FIG. 5, there is shown a magnetically encoded document 29, such as a credit card, having the same edge dimensions as the viewer 30 of FIG. 2. The document 29 contains a substratum 44 of magnetic material. This substratum 44 is preferably a continuous stratum of uniaxially anisotropic magnetically hard barium ferrite particles, such as is described in the aforementioned brochure entitled "Plastiform Brand Permanent Magnets." Preferably this permanent magnet material is oriented in the stratum 44 to have its easy axis of magnetization perpendicular to the stratum 44; and the magnetized regions 28 are provided by magnetizing the permanent magnet material in the direction of this easy axis.

The polarity alignments of the disparate magnetized regions 28 are shown schematically in FIG. 5. The regions 28 preferably would not be visible to the naked eye if one were to view the stratum 44 directly. In the top row 48, the leftmost magnetized region has a magnetic polarity of South at the surface 50 of the stratum 44. In the second row 52, the leftmost magnetized region has a magnetic polarity of North at the surface 50. At the surface 50 of the stratum 44, the polarity of the remaining magnetized regions 28 may be readily ascertained from examination of FIG. 5. Except where indicated by either an "N" or an "S", there is no appreciable magnetized region at the surface 50 of the stratum 44.

When the viewer 30 (FIG. 2) is correctly registered with the magnetically encoded document 29 (FIG. 5), the disks 34 assume an orientation as illustrated in FIG. 2, wherein the dark surface of the disk indicates a South surface polarity and the light surface of the disk indicates a North surface polarity.

The thickness of the document is approximately 30 mils (0.75 mm). The residual induction $B_r$ of the magnetized material at the magnetized regions 28 of the document 29 is approximately 2000 gauss. This residual induction is sufficient to overcome the mutual attraction of the disks 34 of viewer 30 for each other and to attract the disks 34 to an orientation responsive to the orientation of the disparate magnetized regions 28 of the document 29 when the viewer 30 is placed on top of and aligned with the edges of the document 29.

The viewer of the present invention may also be used to provide a visual indication of information encoded in the type of magnetically encoded document which is discussed hereinafter with reference to FIGS. 6, 7, 8 and 9, which type of document is the subject of my copending application Ser. No. 88,621 filed on Nov. 12, 1970 entitled "Magnetically Encoded Document."

The document 54 of FIG. 6 differs from the document 29 of FIG. 5 primarily in that the fixed pattern is defined by a plurality of disparate magnetized regions 56 in the stratum 58 which comprise pairs of magnetized sections 60, 62 which are labeled "N" and "S" for North and South magnetic polarities, respectively. The sections 60, 62 preferably would not be visible to the naked eye if one were to view the stratum 58 directly.

In the document of FIG. 6, the stratum 58 is not appreciably magnetized except in those sections 60, 62 which are labeled either "N" or "S."

In the document shown in FIG. 6, the permanent magnet material is magnetized in the direction of its easy axis of magnetization which is perpendicular to the stratum 58. Therefore, the magnetic polarity at the upper surface 64 of the stratum 58 is opposite to the magnetic polarity at the surface of the stratum 58 opposite to the surface 64 thereof.

Each oppositely magnetized pair of sections 60, 62 has a boundary 66 therebetween. The angles to which the boundaries 66 extend breadthwise in the stratum 58 represent encoded data, with any given angle being unique to certain data.

For purposes of illustration, the boundaries 66 are shown to extend at five different angles breadthwise in the stratum 58. Comparing the top row 68 of magnetized regions 56 with the bottom row 70 of magnetized regions 56, it is seen that although the angles of extension of the boundaries 66 are the same in the adjacent magnetized regions 56 of the two rows 68, 70, the orientations of the magnetized section polarities N and S with respect to the boundaries 66 are different. Therefore, by variation in the orientation of the magnetized section polarities N and S with respect to the boundaries 66 therebetween, the number of different data which may be represented is double the number of different angles of extension which may be encoded in the stratum 58. In the document 54 of FIG. 6, the boundaries 66 extend at five different angles and, because of the variation in the orientation of the magnetized section polarities N and S with respect to the boundaries 66, represent ten different data.

The angles of extension of the boundaries 66 and the orientation of the magnetized section polarities N and S with respect thereto as illustrated in FIG. 6 may represent the numerals 1 2 3 4 5 6 7 8 9 0, when reading from left to right in the two rows 68, 70 sequentially.

A magnetic viewer 72 according to the present invention for providing a visual indication of data encoded in the type of document 54 (FIG. 6) is shown in FIG. 7. The viewer 72 differs from the viewers 10, 30 of FIGS. 1 and 2 primarily in that the disks 74 (FIG. 8A) are magnetized to contain upon the broad surface 75 opposite to differently colored areas 76 and 78 a pair of magnetized sections of opposite polarities having a boundary therebetween. A visual indicator 82 corresponding to the boundary is provided on each disk 74 on the surface 84 opposite to the surface 75 having the boundary to indicate the orientation of the boundary and the orientation of the oppositely magnetized sections with respect to the boundary. For the disk of FIG. 8A, a two-colored layer 86 of reflex-reflective material provides the visual indicator 82 of the boundary. The visual indicator 82 is the line of color separation which corresponds to the orientation of the boundary. The light-colored reflex-reflective material in area 78 indicates one magnetic surface polarity, such as North, at the underlying portion of the surface 84, and the darker colored reflex-reflective material in area 76 indicates the opposite magnetic surface polarity, such as South, at the underlying portion of the surface 84. That is to say, the light-colored material, by indicating a North polarity beneath area 78 at the surface 84 of the disk covered by a reflex-reflective material area 78, conversely indicates a South polarity at the section of the flat surface 75 which is opposite to area 78. The permanent magnet material in the disks 74 is also oriented to have an easy axis of magnetization perpendicular to the flat surfaces 75, 84 of the disks 74.

The magnetized disk 74 shown in FIGS. 7 and 8A may be produced in the following manner. The visual indicators are affixed on a sheet of magnetically hard magnet material having its easy axis of magnetization perpendicular to its broad plane. This sheet is placed between and in contact with a serpentine pattern of copper wire and a steel sheet, with the copper wires registered with the visual indicators. A pulse of electrical current is sent through the wire by discharge of a charged capacitor bank, thereby producing alternately polarized magnetized sections, with boundaries coinciding with the copper wire locations. Disks are then stamped from the sheet so that they have oppositely magnetized sections upon their broad surfaces on opposite sides of the visual indicators.

Alternative embodiments of the magnetized disks 74 are shown in FIGS. 8B and 8C.

The orientation of the boundary and the orientations of the oppositely magnetized sections with respect thereto are indicated by an arrow 87 on the surface 88 of the disk 90 shown in FIG. 8B. The arrow 87 is preferably either parallel (as shown in FIG. 8B) or perpendicular to the boundary. For the disks 90 of the type shown in FIG. 8B, when the arrow is parallel to the boundary, a magnetized section of one surface polarity, such as North, is on the left side of the arrow 87, and the magnetized section of opposite surface polarity, such as South, is on the opposite side of the arrow 87. When the arrow 87 is perpendicular to the boundary, the arrow 87 points to a magnetized section of one given polarity.

The disk 92 of FIG. 8C differs from the disk 74 of FIG. 8A in that a layer of ferromagnetic material 94 such as a steel foil is placed between the reflective material 96 and the permanent magnet material 98 to increase the magnetic attractive force.

The magnetic attractive forces provided at the magnetized regions 56 of the document 54 can be increased if the surface of the stratum 58 opposite to the surface 64 thereof is backed with steel.

Referring to FIGS. 9A and 9B, it is seen that the sockets 100 of the viewer 72 are of such dimensions that the disks 74 cannot flip over but always maintain their faces 84 containing the visual indicators 82 toward the transparent cover 102 of the viewer 72. The depth of each socket 100 is approximately three thirty-seconds inch (2.4 mm). Referring to FIG. 9A, a disk 74 assumes a flat orientation in the socket 100 when positioned over a boundary 66 between sections 60, 62 of opposite polarities, whereas in FIG. 9B the disk 74 is seen to assume a skewed orientation in the socket 100 when positioned over a magnetized region of a single magnetic polarity.

When the document 54 is interfaced with the viewer 72 of the present invention so that the magnetized regions 56 are correctly registered with the sockets 100, the disks 74 will seek a directional orientation wherein they lie flat in the sockets 100 with the visual indicators 82 of the disks 74 oriented parallel to the boundaries 66 in the stratum 58. The orientation of the disks 74 in the viewer 72 corresponds to the alignment thereof which occurs when the viewer 72 is registered with the document 54 of FIG. 6.

Still in accordance with the present invention, it is envisioned that certain of the magnetized regions in the document might not contain magnetized sections having a boundary extending therebetween, but rather the document might be magnetized to contain a region of only one magnetic surface polarity, such as North or South, or, alternatively, might be unmagnetized. Accordingly, a viewer for use with such a document would contain magnetized disks of the type shown in FIG. 4 in certain preselected sockets and magnetized disks of the type shown in FIG. 8A in other preselected sockets. Such envisioned variations may provide further coding complexities.

In FIG. 10, there is shown an embodiment of the socket and disk combination wherein the background 114 of the socket 116 is a third color contrasting to the first and second colors 118, 120 on the opposite sides of the disk 122. This embodiment provides three-color coding possibilities.

The disk 122 may be made to stand on edge by externally applied oppositely polarized magnetic fields provided by oppositely polarized magnetized sections, such as are described above with reference to the document 54 of FIG. 6. The edge 124 of the disk 122 can be colored to be the same color as the background 114 of the socket 116. Alternatively, the edge 124 of the disk 122 can be colored to contrast with the color of the background 114 so that the orientation of the disk 122 can be used to indicate the orientation of a boundary 66 such as is shown in the document 54 of FIG. 6.

Another embodiment of a display device or viewer is shown in FIG. 11, wherein the sockets 126 and disks 128 are elongated. The sockets are arranged in a pattern wherein ten different numerical characters may readily be formed, depending upon the orientation of the disks 128. In FIG. 11, the dark-colored disks 130 have been oriented to form the character 7.

In another embodiment of the viewer (not shown) of the type shown in FIGS. 1 and 2, at specified sockets the relationship between the color of the sides of the disks and the magnetic polarity at the sides of the disks is scrambled in a predetermined manner. A person using such a viewer to determine the magnetic polarity at each of the various magnetized regions in a document such as the document of FIG. 5 would have a different time doing so if he did not know the predetermined scrambled relationship between the colors of the disks and the magnetic polarities thereof.

What I claim is:

1. A magnetic data viewer for providing a visual indication of data encoded in a magnetically encoded document, which data is represented by the magnetic polarity alignments of a plurality of disparate magnetized regions defining a fixed two-dimensional pattern, which viewer comprises a non-magnetizable board having no internal magnetic structure, having a viewing surface and containing a plurality of segregated sockets positioned corresponding to the fixed pattern of said encoded document;

each of which sockets contains a single disk containing magnetically hard material which is magnetized to provide a polarity alignment wherein at least one broad surface has a pair of magnetized sections of opposite polarities having a boundary therebetween, and wherein one opposite broad surface has a visual indicator corresponding to the boundary for indicating the orientation of the boundary; and each of which disks is visible in its socket, is maintained with its broad surface containing the visual indicator facing toward the viewing surface of the viewer, and is movable within its socket to a position wherein the visual indicator assumes an orientation corresponding to the magnetic polarity alignment of one of said magnetized regions to indicate the data represented by said one of said regions when said viewer is interfaced with said document.

2. A device according to claim 1, wherein each disk includes uniaxially anisotropic magnetically hard material oriented to have an easy axis of magnetization perpendicular to the broad surfaces of the disk, in the direction of which eacy axis the magnetically hard material is magnetized.

3. A device according to claim 1, wherein the visual indicator of each disk corresponding to the boundary comprises a color change at the boundary for indicating the polarity and orientation of the oppositely magnetized sections of the disk with respect to the boundary.

4. A device according to claim 3, wherein the color change at the boundary is provided by a highly reflective material, such as a mirror-like or reflex-reflective material.

5. A magnetic data viewer for providing a visual indication of a datum encoded in a magnetically encoded document, which datum is represented by the magnetic polarity alignment of a magnetized region which viewer comprises a non-magnetizable board having no internal magnetic structure and containing a single socket;

which socket contains a single disk containing magnetically hard material which is magnetized to have a given magnetic polarity alignment, with at least one broad surface of the disk having a visual indicator for providing an indication of the magnetic polarity alignment of the disk;

which disk is visible in its socket, is restrained from movement within its socket by only the dimensions of the socket and is movable within its socket to assume an orientation corresponding to the magnetic polarity alignment of said magnetized region when said viewer is interfaced with said document so that the orientation of the disk in its socket indicates the encoded data of said document.

6. A viewer according to claim 5, in which the magnetically hard material of the disk is magnetized to provide the opposite broad surfaces of the disk with opposite magnetic polarities; and the broad surface of one polarity has a visual indicator of a first color and the broad surface of the opposite polarity has a visual indicator of a second color.

7. A viewer according to claim 5, in which the magnetically hard material of the disk is magnetized to provide at least one broad surface of the disk with a pair of magnetized sections of opposite polarities having a boundary therebetween, and at least one opposite broad surface has a visual indicator corresponding to the boundary for indicating the orientation of the boundary.

8. A method for providing a visual indication of data encoded in a magnetically encoded document, which document comprises a broad stratum containing magnetic material magnitized to provide a plurality of disparate magnetized regions of various polarity alignments defining a fixed two-dimensional pattern over the stratum, wherein polarity alignments of the disparate magnetized regions represent encoded data, which method comprises interfacing said document with a viewer which comprises a non-magnetizable board having no internal magnetic structure and containing a plurality of sockets positioned in said fixed pattern; each of which sockets contains a disk containing magnetically hard material which is magnetized to have a given magnetic polarity alignment, with at least one broad surface of a disk having a visual indicator for providing an indication of the magnetic polarity alignment of the disk; each of which disks is visible in its socket, is restrained from movement within its socket by only the dimensions of the socket, and is movable within its socket to assume an orientation corresponding to the magnetic polarity alignment of one of said magnetized regions when said board is registered with said document so that the orientation of the disks in their sockets indicates the encoded data of said document.

9. A magnetic data viewer for providing a visual indication of data encoded in a magnetically encoded document when interfaced with said document, which data is represented by the magnetic polarity alignments of a plurality of disparate magnetized regions defining a fixed two-dimensional pattern, which viewer comprises a non-magnetizable board having no internal magnetic structure and containing a plurality of segregated sockets positioned in said fixed pattern;

each of which sockets contains a single disk containing magnetically hard material which is magnetized to have a given magnetic polarity alignment, with at least one broad surface of the disk having a visual indicator for providing an indication of the magnetic polarity alignment of the disk;

each of which disks is visible in its socket, and is movable within its socket to assume a stable orientation corresponding to the magnetic polarity alignment of one of said magnetized regions.

10. A magnetic data viewer for providing a visual indication of data encoded in a magnetically encoded document, which data is represented by the magnetic polarity alignments of a plurality of disparate magnetized regions defining a fixed two-dimensional pattern, which viewer comprises a non-magnetizable board having no internal magnetic structure and containing a plurality of segregated sockets positioned in said fixed pattern;

each of which sockets contains a single disk containing magnetically hard material which is magnetized to have a given magnetic polarity alignment, with at least one borad surface of the disk having a visual indicator for providing an indication of the magnetic polarity alignment of the disk, wherein each disk includes uniaxially anistropic magnetically hard material oriented to have an easy axis of magnetization perpendicular to the broad surfaces of the disk, in the direction of which easy axis, the magnetically hard material is magnetized;

each of which disks is visible in its socket, is restrained from movement within its socket by only the dimensions of the socket, and is movable within its socket to assume an orientation corresponding to the magnetic polarity alignment of one of said magnetized regions when said viewer is interfaced with said document.

11. A viewer according to claim 10 wherein each of said disks, the magnetically hard material is magnetized to provide the opposite broad surfaces of each disk with opposite magnetic polarities; and the broad surface of one polarity has a visual indicator of a first color and the broad surface of the opposite polarity has a visual indicator of a second color; and wherein the background in the sockets is a third color contrasting with the first and second colors.

12. A magnetic data viewer for providing a visual indication of data encoded in a magnetically encoded document when interfaced with said documents, which data is represented by the magnetic polarity alignments of a plurality of disparate magnetized regions defining a fixed two-dimensional pattern, which viewer comprises a non-magnetizable board having an internal magnetic structure and containing a plurality of segregated sockets positioned in said fixed pattern;

each of which sockets contains a single disk containing magnetically hard material which is magnetized to have a given magnetic polarity alignment, with at least one broad surface of the disk having a visual indicator for providing an indication of the magnetic polarity alignment of the disk;

each of which disks is visible in its socket, is restrained from movement within its socket by only the dimensions of the socket, and is movable within its socket to assume an orientation corresponding to the magnetic polarity alignment of one of said magnetized regions;

wherein the residual induction $B_r$ of each disk and the spacing of the sockets are so selected that in the absence of an applied external magnetic field the disks are attracted by each other to align themselves in a stable position wherein the broad surfaces of the disks are skewed in the sockets.

13. A device according to claim 10, wherein the board is a transparent material.

14. A device according to claim 10, wherein the residual induction $B_r$ of each disk and the spacing of the sockets are so selected that, in the absence of an applied external magnetic field, the disks are attracted by each other to align themselves in a stable position wherein the broad surfaces of the diss are skewed in the sockets.

15. A device according to claim 10, further comprising a stratum containing ferromagnetic material adjacent only the back side of the non-magnetizable board for holding the disks, in the absence of an applied external magnetic field, in the positions to which said disks are oriented for viewing by the application of external disparate magnetic fields in said fixed pattern, in which oriented positions the disks lie flat in the sockets.

* * * * *

UNITED STATES PATENT OFFICE

CERTIFICATE OF CORRECTION

Patent No. 3,787,839 Dated January 22, 1974

Inventor(s) RICHARD E. FAYLING

It is certified that error appears in the above-identified patent and that said Letters Patent are hereby corrected as shown below:

Abstract, Line 27, change "manetically" to --magnetically--.

Column 1, line 54, change "board" to --broad--.

Column 5, line 21, change "as" to -a-.

Column 10, lines 10-11, change "different" to --difficult--;

line 49, change "eacy" to --easy--.

Column 11, line 35, change "magnitized" to --magnetized--.

Column 12, line 24, change "borad" to --broad--.

Column 14, line 5, change "diss" to --disks--.

Signed and sealed this 9th day of July 1974.

(SEAL)
Attest:

McCOY M. GIBSON, JR.
Attesting Officer

C. MARSHALL DANN
Commissioner of Patents